United States Patent
Koester et al.

(10) Patent No.: US 11,221,768 B2
(45) Date of Patent: Jan. 11, 2022

(54) SAFE SHARED VOLUME ACCESS

(71) Applicant: International Business Machines Corporation, Armonk, NY (US)

(72) Inventors: Michael Koester, Hollister, CA (US); Kevin L. Miner, Lake City, FL (US); Jeanne Vangsness, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 16/174,212

(22) Filed: Oct. 29, 2018

(65) Prior Publication Data
US 2020/0133516 A1   Apr. 30, 2020

(51) Int. Cl.
G06F 3/00 (2006.01)
G06F 3/06 (2006.01)

(52) U.S. Cl.
CPC .......... *G06F 3/0619* (2013.01); *G06F 3/0644* (2013.01); *G06F 3/0659* (2013.01); *G06F 3/0673* (2013.01)

(58) Field of Classification Search
CPC .... G06F 3/0619; G06F 3/0644; G06F 3/0659; G06F 3/0673
See application file for complete search history.

(56) References Cited

U.S. PATENT DOCUMENTS

| | | | |
|---|---|---|---|
| 6,253,294 B1 * | 6/2001 | Dahman | G06F 3/0622 710/151 |
| 7,797,577 B2 | 9/2010 | Kalos et al. | |
| 7,895,387 B1 * | 2/2011 | Khodabandehlou | G06F 13/4022 710/11 |
| 8,806,157 B2 | 8/2014 | Broido et al. | |
| 9,690,518 B2 | 6/2017 | Shinaar et al. | |
| 10,001,933 B1 | 6/2018 | Johnson | |
| 10,007,443 B1 | 6/2018 | Rajadnya et al. | |
| 10,025,747 B2 | 7/2018 | Swarbrick et al. | |
| 2005/0044281 A1 * | 2/2005 | McCarthy | G06F 13/372 710/5 |
| 2015/0355860 A1 | 12/2015 | Candelaria et al. | |
| 2017/0111373 A1 | 4/2017 | Morton et al. | |
| 2017/0255419 A1 | 9/2017 | Franke et al. | |

(Continued)

OTHER PUBLICATIONS

Hartig et al.; "An I/O Architecture For Microkenel-Based Operating Systems", Dresden University Of Technology, Sep. 2003.

(Continued)

*Primary Examiner* — Reginald G Bragdon
*Assistant Examiner* — Michael L Westbrook
(74) *Attorney, Agent, or Firm* — Nelson IP; Daniel P. Nelson

(57) ABSTRACT

A method for safely sharing access to a volume is disclosed. In one embodiment, such a method includes notifying a storage system that a volume on the storage system is in use by a first host system. The method stores, on the storage system, a first indicator indicating the volume is in use by the first host system. When the storage system receives an I/O request from a second host system to access data on the volume, the storage system reads the first indicator to determine that the volume is in use by the first host system. The storage system may then reject the I/O request from the second host system as a result of the first indicator. A corresponding system and computer program product are also disclosed.

20 Claims, 7 Drawing Sheets

(56) References Cited

U.S. PATENT DOCUMENTS

2017/0322751 A1   11/2017  Cohen et al.
2018/0018090 A1    1/2018  Lu
2018/0203772 A1    7/2018  Matsuo

OTHER PUBLICATIONS

Zhou, Zongwei; "On-Demand Isolated I/O For Security-Sensitive Applications On Commodity Platforms", Carnegie Mellon University, Dissertations, May 14, 2014.
Cheng et al.; "DriverGuard: A Fine-Grained Protection On I/O Flows", ESORICS'11 16th European Symposium On, Sep. 12-14, 2011.
Barlow, Rick; "Dynamically Managing Hardware I/O Configuration Using VM", Share, Mar. 3, 2009.

\* cited by examiner

SAFE SHARED VOLUME ACCESS

BACKGROUND

Field of the Invention

This invention relates to systems and methods for safely sharing access to volumes.

Background of the Invention

In an enterprise storage system such as the IBM DS8000™ storage system, the storage system is configured to detect when a particular host system is online with respect to a particular volume on the storage system. Currently this is done through the "path group ID." This path group ID identifies, to the storage system, which host system is authorized to access (i.e., read and/or write to) a particular volume. This information may serve various purposes. For example, if a first host system is "online" with respect to a particular volume, and I/O is received for the volume from a second host system, the storage system may reject the I/O from the second host system since the volume is already online with respect to the first host system. This may be done for data integrity purposes and to ensure that the second host system does not corrupt or damage data that is being read from or written to by the first host system.

While a first host system may be "online" relative to a particular volume on the storage system, the first host system may not always be accessing data on the volume. In other words, the volume may be "online" but not "in use" by the first host system. Because of this, some users may enable a second host system to access data on the volume. This may be accomplished by overriding the storage system's normal function of rejecting I/O from a second host system when a volume is "online" with a first host system. Unfortunately, this can be risky and can potentially corrupt or damage data on the volume.

In view of the foregoing, what are needed are systems and methods to enable a first host system to safely access data on a volume even if the volume is "online" to a second host system. Ideally, such systems and methods will eliminate or reduce the chance that data will be corrupted or damaged on the volume.

SUMMARY

The invention has been developed in response to the present state of the art and, in particular, in response to the problems and needs in the art that have not yet been fully solved by currently available systems and methods. Accordingly, systems and methods have been developed to safely share access to a volume. The features and advantages of the invention will become more fully apparent from the following description and appended claims, or may be learned by practice of the invention as set forth hereinafter.

Consistent with the foregoing, a method for safely sharing access to a volume is disclosed. In one embodiment, such a method includes notifying a storage system that a volume on the storage system is in use by a first host system. The method stores, on the storage system, a first indicator indicating the volume is in use by the first host system. When the storage system receives an I/O request from a second host system to access data on the volume, the storage system reads the first indicator to determine that the volume is in use by the first host system. The storage system may then reject the I/O request from the second host system as a result of the first indicator.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
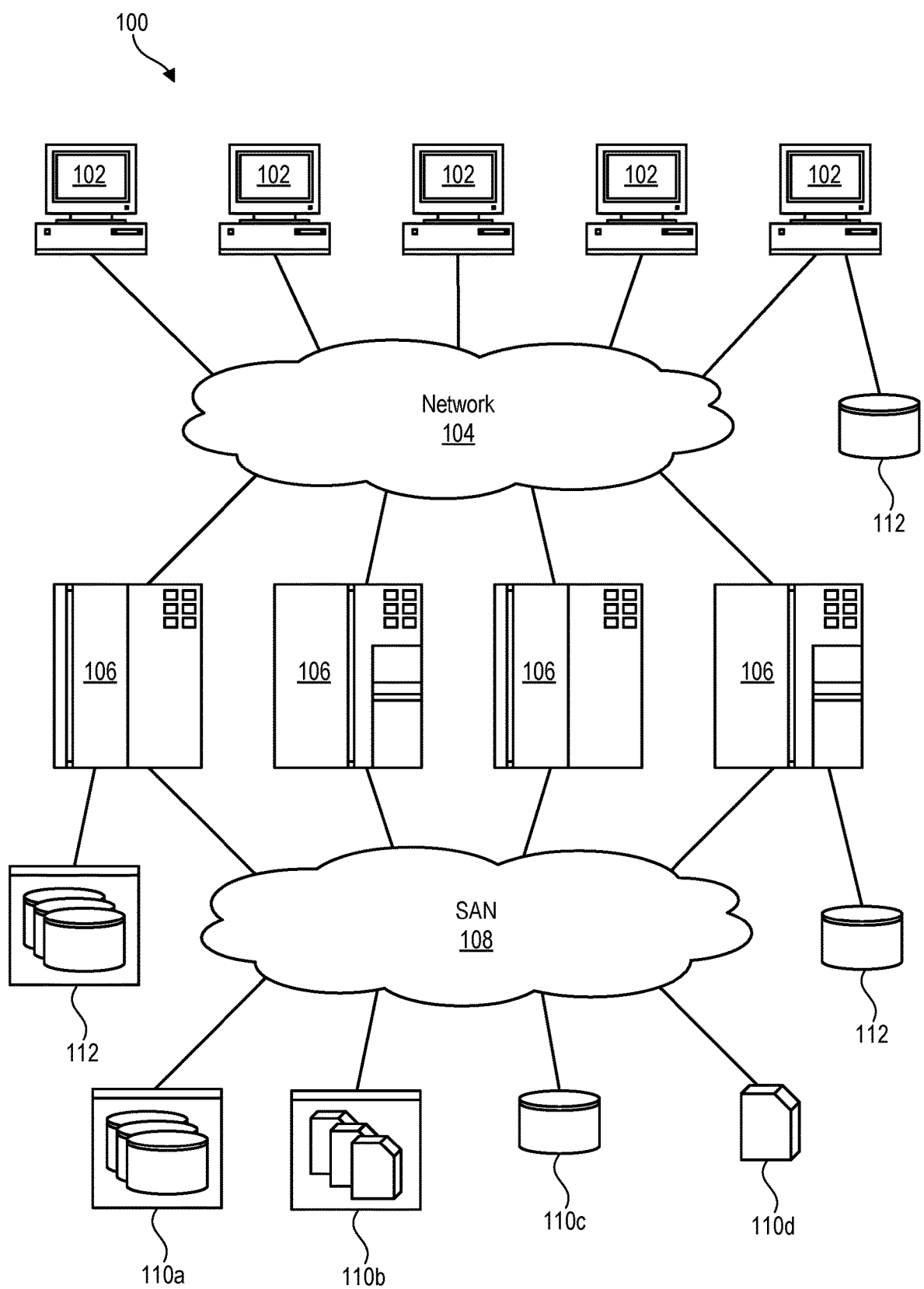
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
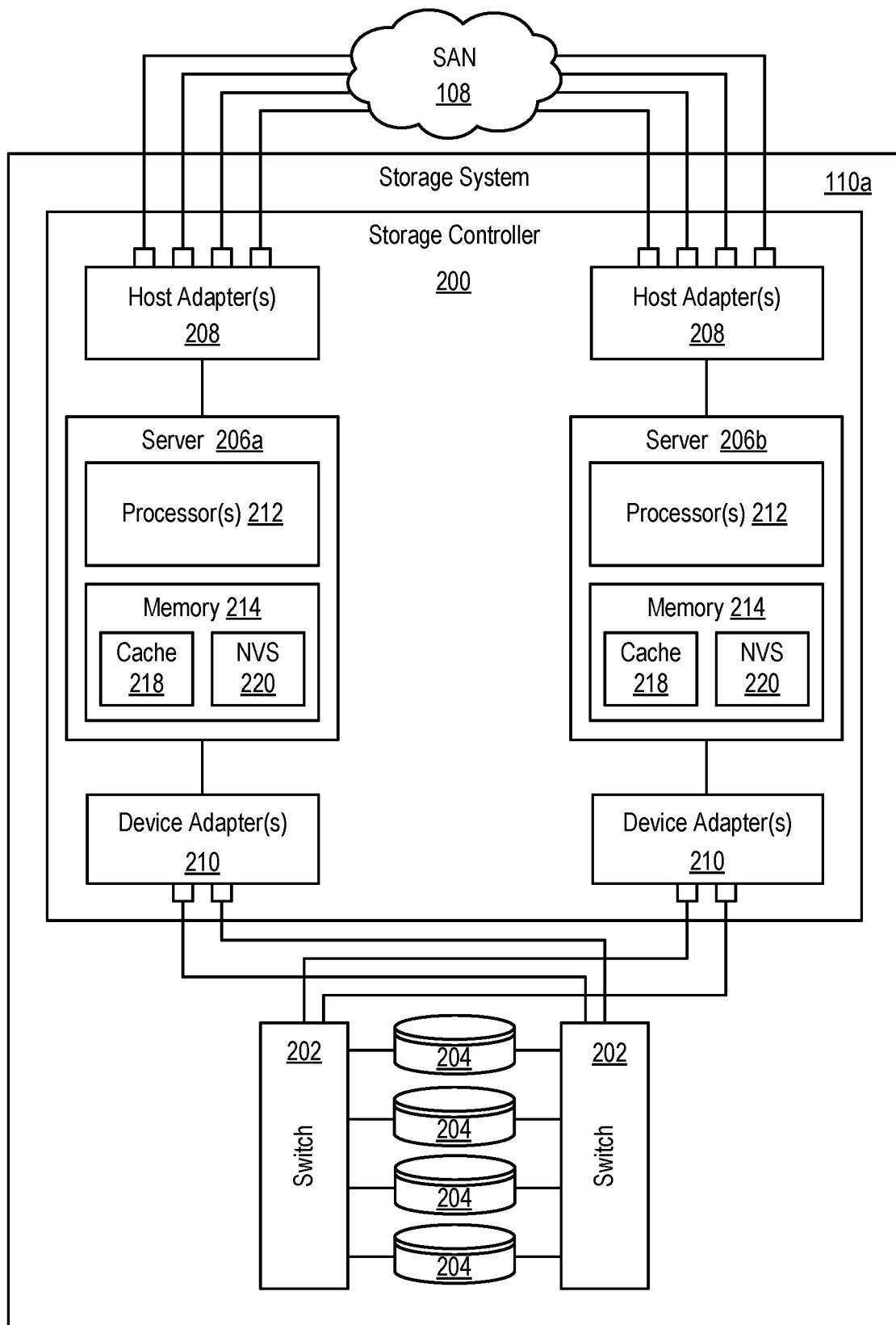
FIG. 2 is a high-level block diagram showing one example of a storage system in which systems and methods in accordance with the invention may be implemented.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within such a storage system 110a, although the systems and methods may also be applicable to other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in cache 218, the write may also be stored in non-volatile storage (NVS) 220 of the opposite server 206 so that the write can be recovered by the opposite server 206 in the event the first server 206 fails. In certain embodiments, the NVS 220 is implemented as battery-backed volatile memory in the opposite server 206.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the systems and methods disclosed herein are not limited to the IBM DS8000™ enterprise storage system 110a, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
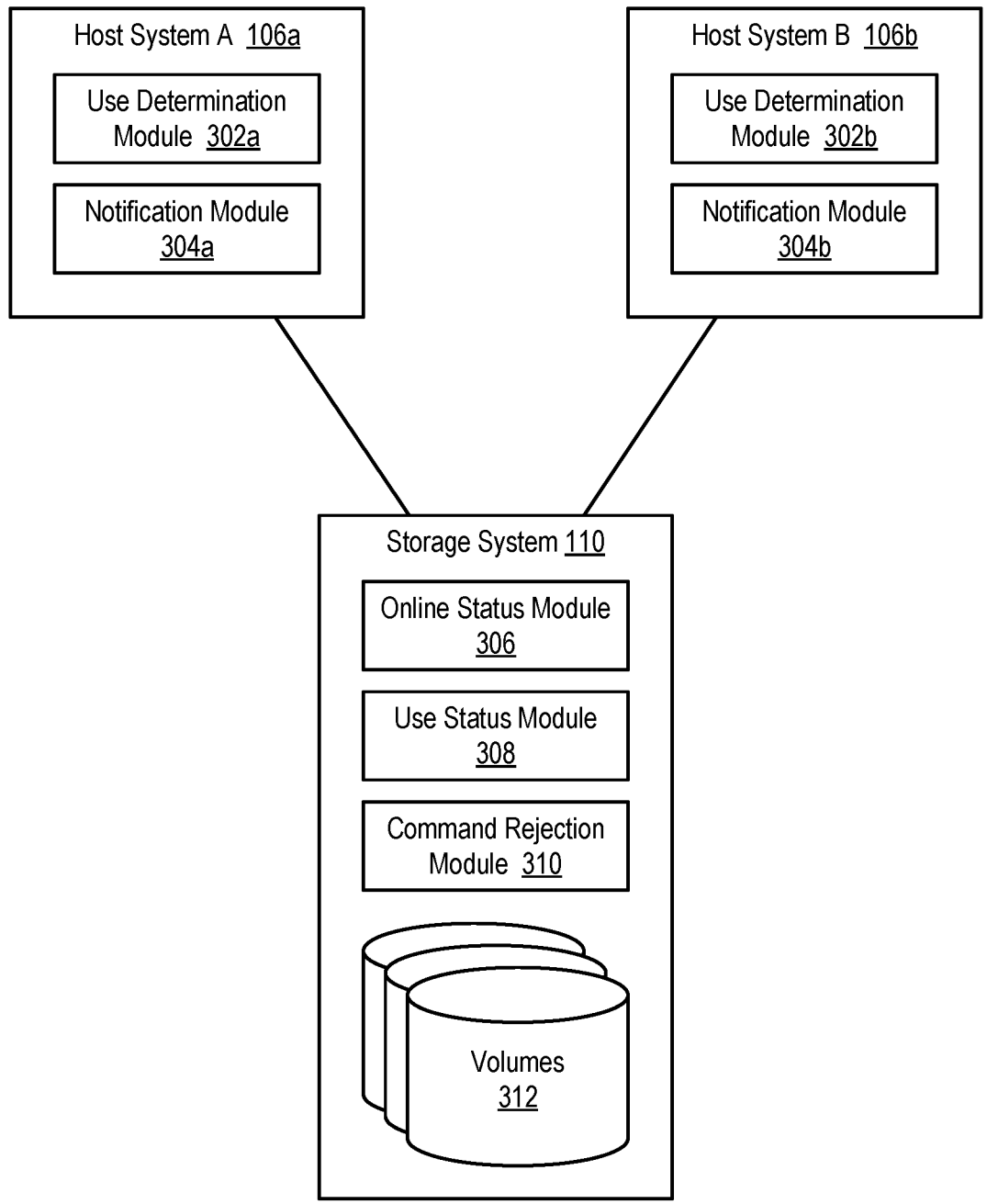
FIG. 3 is a high-level block diagram showing two host systems accessing volumes on a storage system.

Referring to FIG. 3, a high-level block diagram showing two host systems 106 accessing the same volume 312 or volumes 312 on a storage system 100 is illustrated. The volumes 312 may be implemented on the storage drives 204 previously discussed. As previously mentioned, in an enterprise storage system 110 such as the IBM DS8000™, the storage system 110 is configured to detect when a particular host system 106 is online with respect to a particular volume 312 on the storage system 110. In certain cases, this may be accomplished using a "path group ID." This path group ID may identify, to the storage system 110, which host system 106 is authorized to access (i.e., read and/or write) to a particular volume 312. This information may serve various purposes. For example, if a first host system 106a is "online" with respect to a particular volume 312, and I/O is received for the volume 312 from a second host system 106b, the storage system 110 may reject the I/O from the second host system 106b since the volume 312 is already online with respect to the first host system 106a. This may be done for data integrity purposes and to ensure that the second host system 106b does not corrupt or damage data that is being read from or written to by the first host system 106a.

While a host system 106 may be "online" relative to a particular volume 312 on the storage system 110, the host system 106 may not always be accessing data on the volume 312. In other words, the volume 312 may be "online" but not "in use" by the first host system 106a. Because of this, some users may enable a second host system 106b to access data on the volume 312. This may be accomplished by overriding the storage system's normal function of rejecting I/O from a second host system 106b when a volume is "online" with a first host system 106a. Unfortunately, this can be a risky maneuver that can potentially corrupt or damage data on the volume 312.

Thus, systems and methods are needed to enable a first host system 106a to safely access data on a volume 312 even if the volume 312 is "online" with respect to a second host system 106b. Ideally, such systems and methods will eliminate or reduce the chance that data will be corrupted or damaged on the volume 312.

In certain embodiments in accordance with the invention, various modules may be implemented on the host systems 104 and/or storage system 110 to enable safe shared access to the volumes 312. These modules may be implemented in hardware, software, firmware, or combinations thereof. The modules are presented by way of example and not limitation. More or fewer modules may be provided in different embodiments. For example, the functionality of some modules may be combined into a single or smaller number of modules, or the functionality of a single module may be distributed across several modules.

As shown, each host system 106 may be configured with one or more of a use determination module 302 and notification module 304. Similarly, the storage system 110 may be configured with one or more of an online status module 306, use status module 308, and command rejection module 310. In general, these modules may be configured to determine not only when a volume 312 online with respect to a host system 106, but also whether the volume 312 is currently "in use" by the host system 106. This information may enable a storage system 110 to provide safe shared access to the volume 312 by both host systems 104a, 104b.

As shown, an online status module 306 within the storage system 110 may enable the storage system 110 to determine which host systems 104 are "online" with respect to a particular volume 312 on the storage system 110. In certain embodiments, this may be accomplished using a "path group ID." The path group ID may identify, to the storage system 110, whether a host system 106 has access to a particular volume 312. When a volume 312 is brought online to a particular host system 106, the storage system 110, and more particularly the storage controller 200, may group the path group ID associated with the host system 106 to the particular volume 312. This will indicate that the volume 312 is online with respect to the host system 106.

As previously mentioned above, even though a volume 312 may be online to a host system 106, the host system 106 may not always be accessing (reading or writing) data on the volume 312. Stated otherwise, the volume 312 may not always be open on the host system 106. In theory, another host system 106 could access data on the volume 312 while the volume 312 is closed or not "in use". Thus, systems and methods are needed to determine when a volume 312 is "in use" by a particular host system 106 to safely enable access by other host systems 104.

In certain embodiments, a use determination module 302 may be provided on each host system 106 to determine when a particular volume 312 is "in use" (e.g., open) on the host system 106. When the volume 312 is "in use" on the host system 106, the notification module 304 may notify the storage system 110 that the volume 312 is "in use." Similarly, the use determination module 302 may detect when the volume 312 is "not in use." When the volume 312 is "not in use," the notification module 304 may notify the storage system 110 of the change in status. The notification module 304 may notify the storage system 110 each time there is a status change, at specific intervals, and/or in response to inquiries from the storage system 110.

On the storage system 110, the use status module 308 may track the usage status of each host system 106 that is online with respect to a particular volume 312. That is, the use status module 308 may track whether each host system 106 is "in use" or "not in use" with respect to a particular volume 312. This may be accomplished by monitoring for notifications received from the notification module 304 in each host system 106. In certain embodiments, the "in use" or "not in use" status may be saved with the path group identifier for a particular host system 106, although this is not necessary in all embodiments. In the event the online status module 306 detects that a volume 312 is no longer online with respect to a particular volume 312, the use status module 308 may automatically update the usage status associated with the volume 312 from "in use" to "not in use," if it is not already.

Figure 4:
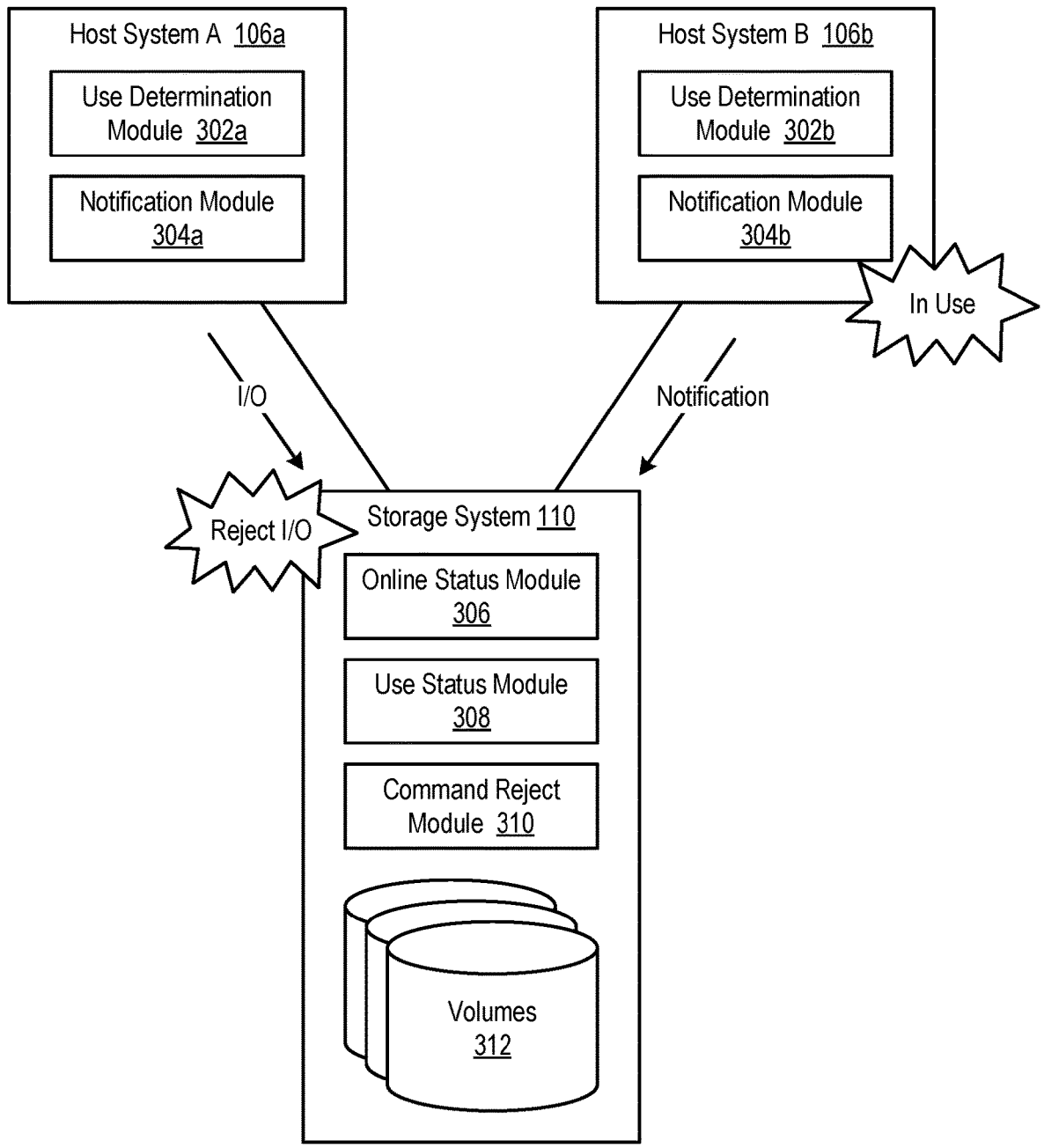
FIG. 4 is a high-level block diagram showing rejection of an I/O request to a volume when the volume is deemed to be "in use" by another host system.
Figure 5:
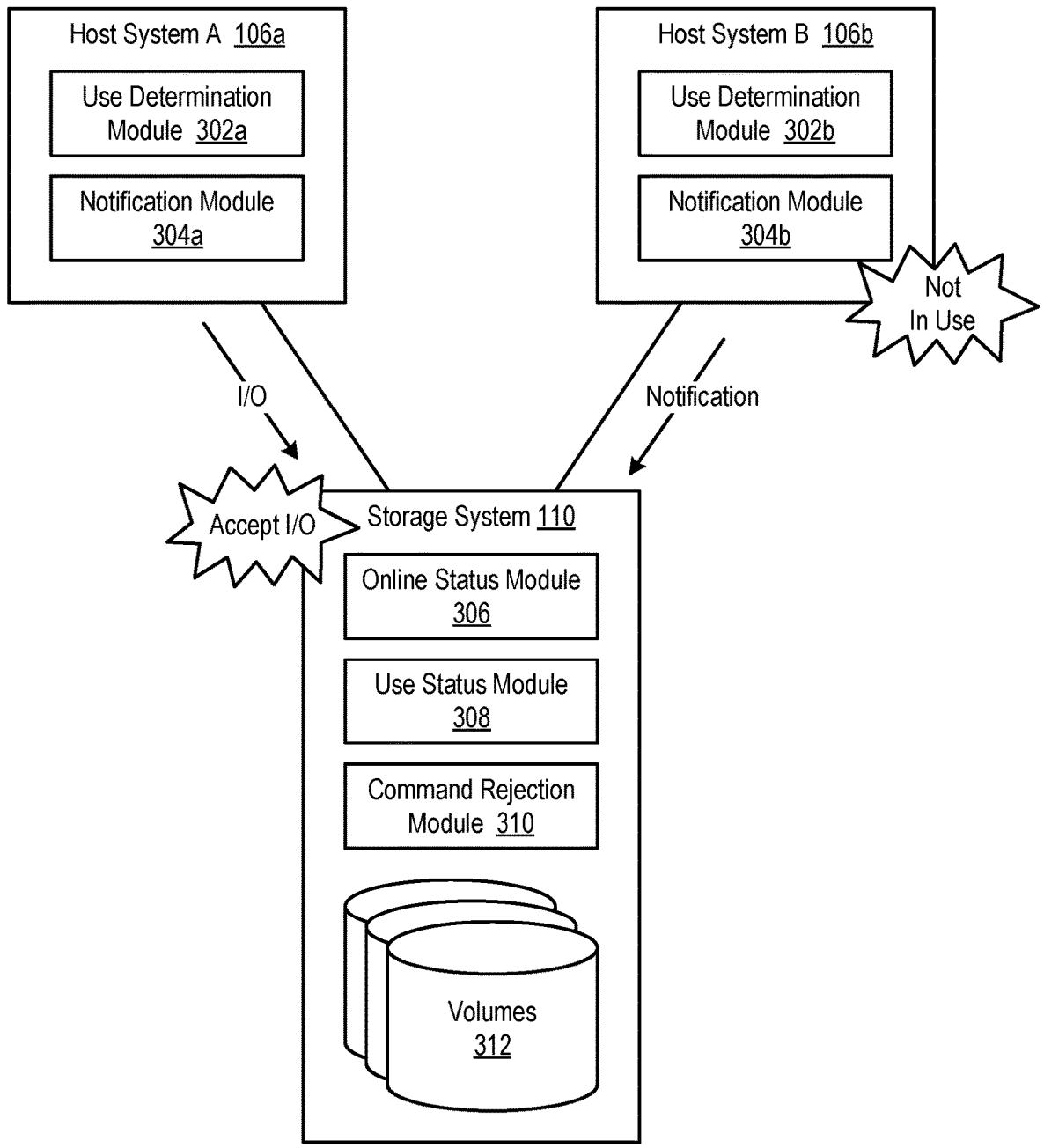
FIG. 5 is a high-level block diagram showing acceptance of an I/O request to a volume when the volume is deemed "not in use" by another host system.

Based on the usage status of a particular host system 106 with respect to a particular volume 312, the command rejection module 310 may reject I/O associated with other host systems 106. For example, if a volume 312 is online and "in use" by a second host system 106b, the command rejection module 310 may reject I/O requests (reads and/or writes) from a first host system 106a, as shown in FIG. 4. Similarly, if a volume 312 is online but "not in use" by a second host system 106b, the command rejection module 310 may accept (i.e., not reject) I/O to the volume 312 from a first host system 106a, as shown in FIG. 5.

Figure 6:
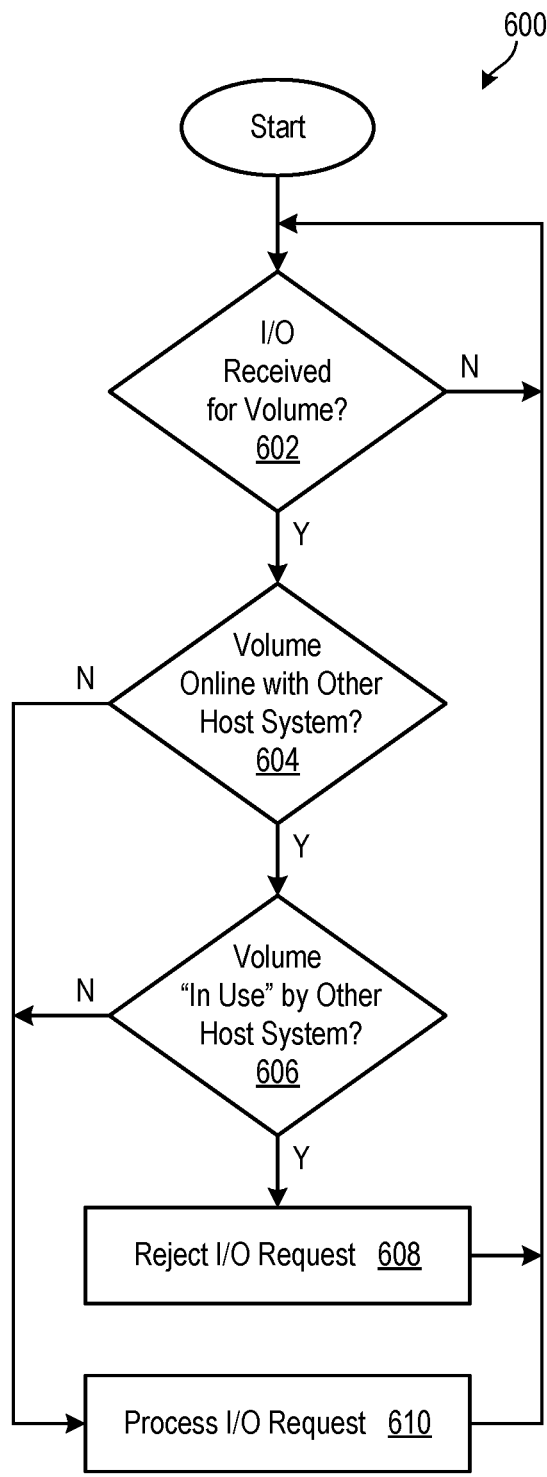
FIG. 6 is a process flow diagram showing a method for processing I/O received by the storage system.

Referring to FIG. 6, one embodiment of a method 600 for processing I/O requests received by a storage system 110 is illustrated. As shown, the storage system 110 initially determines 602 whether an I/O request has been received for a particular volume 312. If an I/O request has been received, the storage system 110 determines 604 whether the volume 312 is online to another host system 106. If the volume 312 is not online to another host system 106, the storage system 110 safely processes the I/O request. If, on the other hand, the volume 312 is online to another host system 106, the storage system 110 determines 606 whether the volume 312 is "in use" by the other host system 106. If the volume 312 is online to the other host system 106 but is "not in use," the storage system 110 safely processes 610 the I/O request. On the other hand, if the volume 312 is "in use" by the other host system 106, the storage system 110 rejects 608 the I/O request since processing the I/O request could potentially corrupt or damage data on the volume 312.

Figure 7:
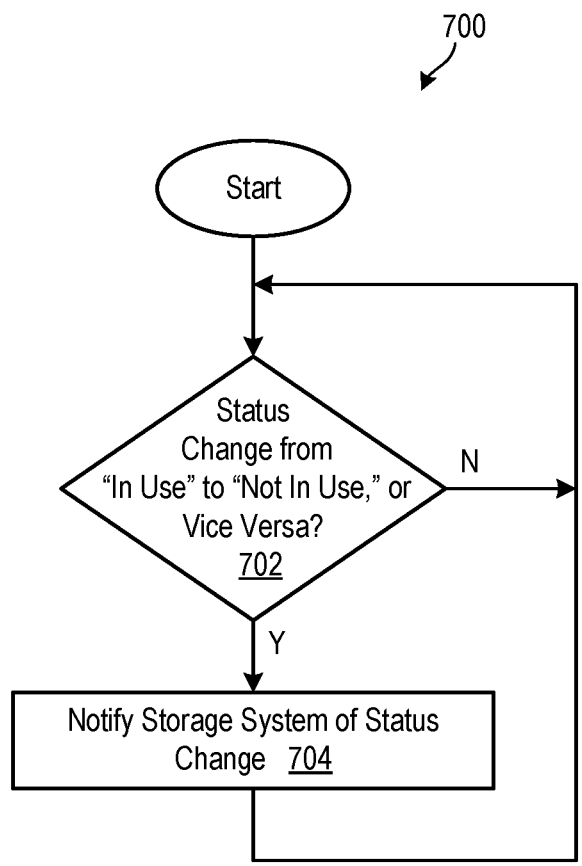
FIG. 7 is a process flow diagram showing a method for notifying a storage system of a usage status change.

Referring to FIG. 7, one embodiment of a method 700 for notifying a storage system 110 of a usage status change is illustrated. Such a method 700 may be executed by a host system 106. As shown, when a host system 106 detects 702 a status change (e.g., change from "in use" to "not in use", or vice versa) with respect to a particular volume 312, the host system 106 notifies 704 the storage system 110 of the status change and/or the current usage status. This will enable the storage system 110 to update its status of the host system 106 relative to the volume 312. Alternatively, or additionally, the host system 106 may periodically notify the storage system 110 of its current usage status with respect to a volume 312 and/or respond to status requests from the storage system 110.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for safely sharing access to a volume, the method comprising:

maintaining, within a storage controller of a storage array, a first indicator and a second indicator, wherein the first indicator when set indicates that a volume on the storage array is authorized to be accessed by a first host system, the second indicator when set indicates that the first host system is currently accessing data on the volume, and the second indicator when not set indicates that the first host system is not currently accessing data on the volume, wherein accessing data on the volume comprises reading or writing data on the volume;

receiving, by the storage controller, a first notification from the first host system indicating that the first host system is currently accessing data on the volume;

setting, by the storage controller in response to receiving the first notification, the second indicator to indicate that the first host system is currently accessing data on the volume;

receiving, by the storage controller, an I/O request from a second host system to access data on the volume;

analyzing, by the storage controller, the second indicator;

in the event the second indicator is set, rejecting, by the storage controller, the I/O request from the second host system;

receiving, by the storage controller, a second notification from the first host system indicating that the first host system is no longer accessing data on the volume; and resetting, by the storage controller in response to receiving the second notification, the second indicator to indicate that the first host system is no longer accessing data on the volume.

2. The method of claim 1, further comprising processing, by the storage controller, the I/O request from the second host system in the event the first indicator is set but the second indicator is not set.

3. The method of claim 1, wherein the first indicator is a unique path group identifier.

4. The method of claim 1, further comprising resetting, by the storage controller, the first indicator when the volume is no longer authorized to be accessed by the first host system.

5. The method of claim 1, further comprising resetting, by the storage controller, the second indicator when the volume is no longer authorized to be accessed by the first host system.

6. The method of claim 1, wherein the second notification is received by the storage controller in response to a request from the storage controller.

7. The method of claim 1, wherein the second notification is received by the storage controller at a specified interval.

8. A computer program product for safely sharing access to a volume, the computer program product comprising a computer-readable storage medium having computer-usable program code embodied therein, the computer-usable program code configured to perform the following when executed by at least one processor:

maintain, within a storage controller of a storage array, a first indicator and a second indicator, wherein the first indicator when set indicates that a volume on the storage array is authorized to be accessed by a first host system, the second indicator when set indicates that the first host system is currently accessing data on the volume, and the second indicator when not set indicates that the first host system is not currently accessing data on the volume, wherein accessing data on the volume comprises reading or writing data on the volume;

receive, by the storage controller, a notification from the first host system indicating that the first host system is currently accessing data on the volume;

set, by the storage controller in response to receiving the notification, the second indicator to indicate that the first host system is currently accessing data on the volume;

receive, by the storage controller, an I/O request from a second host system to access data on the volume;

analyze, by the storage controller, the second indicator;

in the event the second indicator is set, reject, by the storage controller, the I/O request from the second host system;

receive, by the storage controller, a second notification from the first host system indicating that the first host system is no longer accessing data on the volume; and reset, by the storage controller in response to receiving the second notification, the second indicator to indicate that the first host system is no longer accessing data on the volume.

9. The computer program product of claim 8, wherein the computer-usable program code is further configured to process, on the storage controller, the I/O request from the second host system in the event the first indicator is set but the second indicator is not set.

10. The computer program product of claim 8, wherein the first indicator is a unique path group identifier.

11. The computer program product of claim 8, wherein the computer-usable program code is further configured to reset, on the storage controller, the first indicator when the volume is no longer authorized to be accessed by the first host system.

12. The computer program product of claim 8, wherein the computer-usable program code is further configured to reset, on the storage controller, the second indicator when the volume is no longer authorized to be accessed by the first host system.

13. The computer program product of claim 8, wherein the second notification is received by the storage controller in response to a request from the storage.

14. The computer program product of claim 8, wherein the second notification is received by the storage controller at a specified interval.

15. A system for safely sharing access to a volume, the system comprising:

at least one processor;

at least one memory device operably coupled to the at least one processor and storing instructions for execution on the at least one processor, the instructions causing the at least one processor to:

maintain, within a storage controller of a storage array, a first indicator and a second indicator, wherein the first indicator when set indicates that a volume on the storage array is authorized to be accessed by a first host system, the second indicator when set indicates that the first host system is currently accessing data on the volume, and the second indicator when not set indicates that the first host system is not currently accessing data on the volume, wherein accessing data on the volume comprises reading or writing data on the volume;

receive, by the storage controller, a notification from the first host system indicating that the first host system is currently accessing data on the volume;

set, by the storage controller in response to receiving the notification, the second indicator to indicate that the first host system is currently accessing data on the volume;

receive, by the storage controller, an I/O request from a second host system to access data on the volume;

analyze, by the storage controller, the second indicator;

in the event the second indicator is set, reject, by the storage controller, the I/O request from the second host system;

receive, by the storage controller, a second notification from the first host system indicating that the first host system is no longer accessing data on the volume; and reset, by the storage controller in response to receiving the second notification, the second indicator to indicate that the first host system is no longer accessing data on the volume.

16. The system of claim 15, wherein the instructions further cause the at least one processor to process, on the storage controller, the I/O request from the second host system in the event the first indicator is set but the second indicator is not set.

17. The system of claim 15, wherein the first indicator is a unique path group identifier.

18. The system of claim 15, wherein the instructions further cause the at least one processor to reset, on the storage controller, the first indicator when the volume is no longer authorized to be accessed by the first host system.

19. The system of claim 15, wherein the instructions further cause the at least one processor to reset, on the storage controller, the second indicator when the volume is no longer authorized to be accessed by the first host system.

20. The system of claim 15, wherein the second notification is received by the storage controller in response to a request from the storage controller.

* * * * *